(No Model.) 5 Sheets—Sheet 1.

C. A. STERLING & J. E. WILSON.
MACHINE FOR SEPARATING COILED BARS OR RODS.

No. 505,071. Patented Sept. 12, 1893.

Witnesses
Chas. Hanimann
N. Marler

Inventors
Chas. A. Sterling
Jas. E. Wilson
By their Attorney
Chas. W. Forbes (No Model.)
C. A. STERLING & J. E. WILSON.
MACHINE FOR SEPARATING COILED BARS OR RODS.
No. 505,071. Patented Sept. 12, 1893.
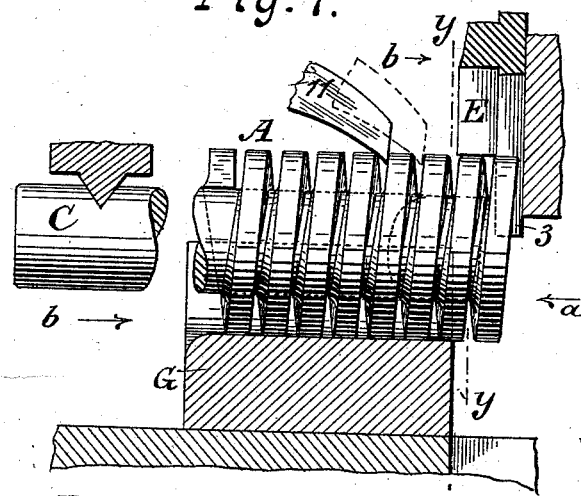
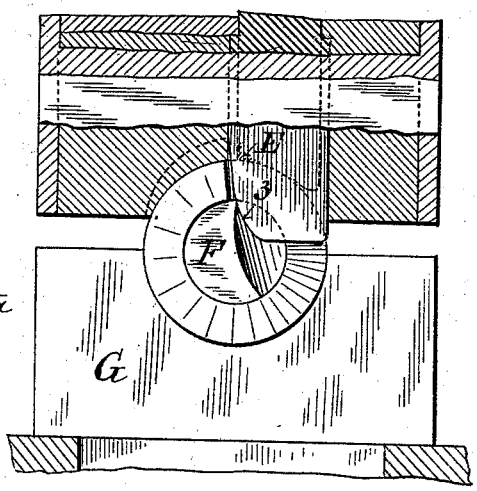
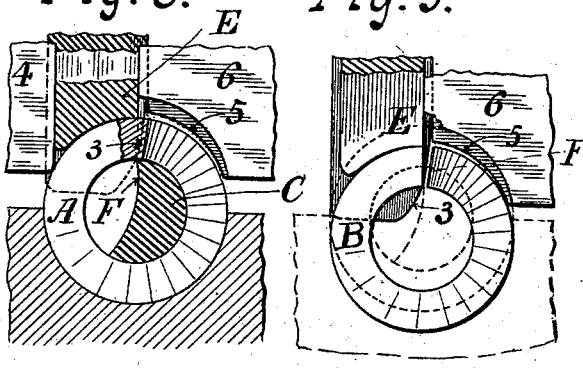
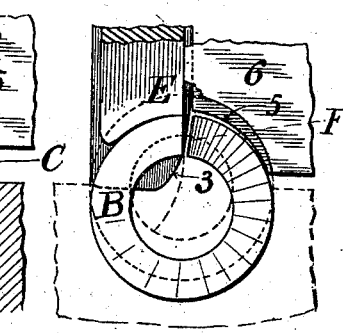
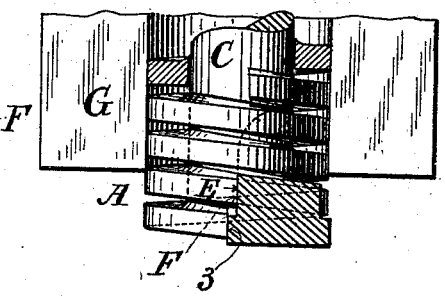
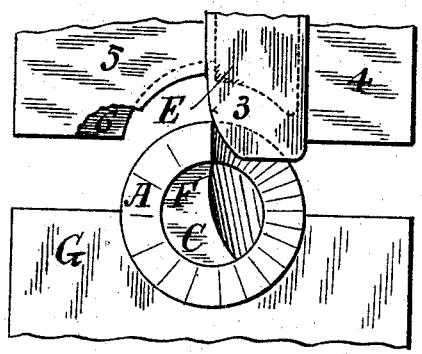
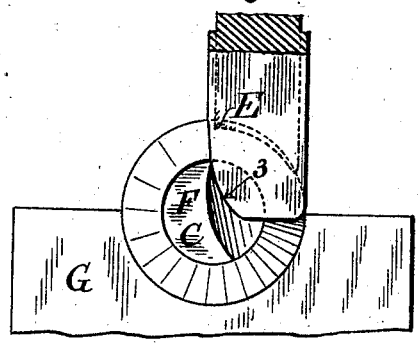
Witnesses
Chas. Hanimann.
H. Marler
Inventors
Chas. A. Sterling
Jas. E. Wilson
By his Attorney
Chas. W. Jones (No Model.) 5 Sheets—Sheet 3.

C. A. STERLING & J. E. WILSON.
MACHINE FOR SEPARATING COILED BARS OR RODS.

No. 505,071. Patented Sept. 12, 1893.

Witnesses
Chas. Hanimann
N. Marlin

Inventors
Chas. A. Sterling
Jas. E. Wilson
By their Attorney
Chas. W. ooks (No Model.) 5 Sheets—Sheet 4.
C. A. STERLING & J. E. WILSON.
MACHINE FOR SEPARATING COILED BARS OR RODS.
No. 505,071. Patented Sept. 12, 1893.
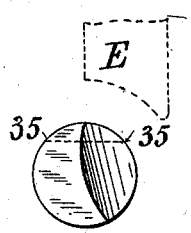
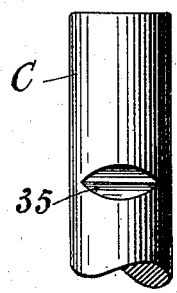
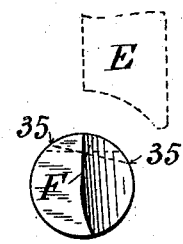
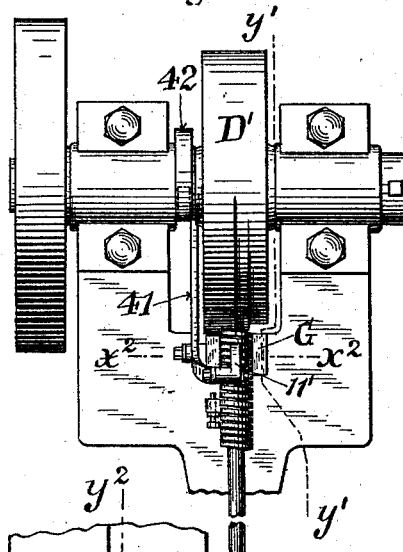
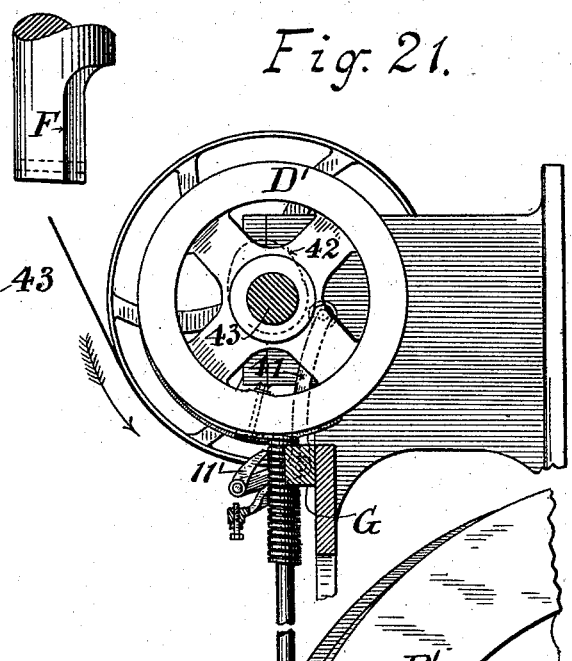
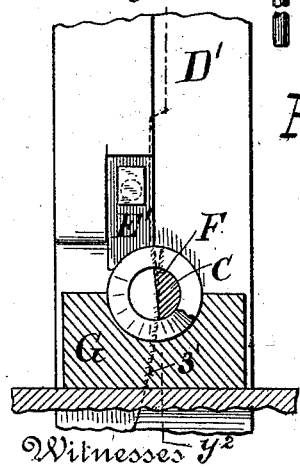
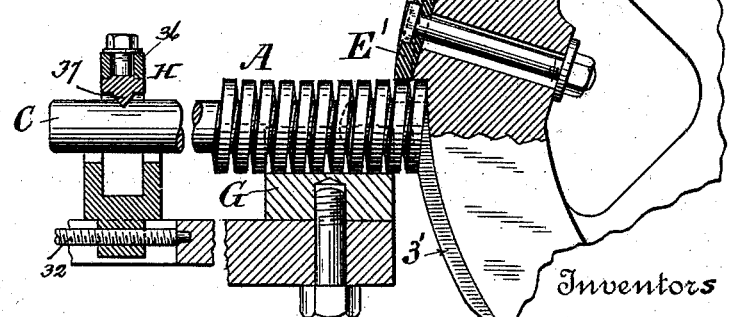

(No Model.) 5 Sheets—Sheet 5.

C. A. STERLING & J. E. WILSON.
MACHINE FOR SEPARATING COILED BARS OR RODS.

No. 505,071. Patented Sept. 12, 1893.

Witnesses
Chas. Hanimann
N. Marler

Inventors
Chas. A. Sterling
Jas. E. Wilson
By their Attorney
Chas. W. Forbes

UNITED STATES PATENT OFFICE.

CHARLES A. STERLING, OF EAST ORANGE, NEW JERSEY, AND JAMES E. WILSON, OF NEW YORK, N. Y.; SAID WILSON ASSIGNOR TO SAID STERLING.

MACHINE FOR SEPARATING COILED BARS OR RODS.

SPECIFICATION forming part of Letters Patent No. 505,071, dated September 12, 1893.

Application filed March 22, 1892. Serial No. 426,014. (No model.)

*To all whom it may concern:*

Be it known that we, CHARLES A. STERLING residing at East Orange, in the county of Essex and State of New Jersey, and JAMES E. WILSON, residing in the city, county, and State of New York, both citizens of the United States, have invented a certain new and Improved Machine for Separating Coiled Bars or Rods, of which the following is a specification.

This invention relates to the manufacture of open washers, links, and other articles of similar conformation, and consists in a novel machine for successively separating one or more coils or convolutions from a helical bar or rod as hereinafter particularly described.

The machine illustrated and described embodying the invention is especially designed for the manufacture of helical spring washers used for locking and securing a nut upon its bolt, but may be adapted for other purposes without departing from the general organization or dispensing with the essential elements claimed.

Figure 1:
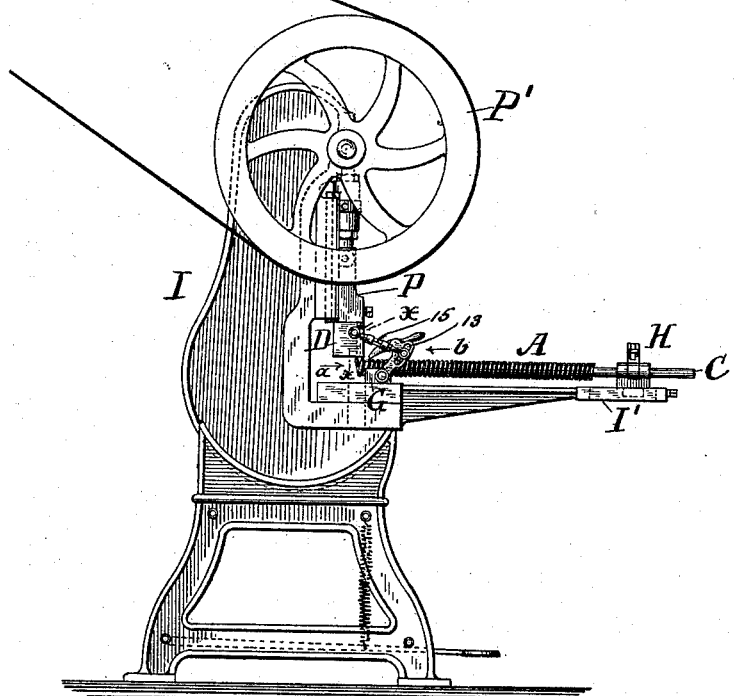
Figure 2:
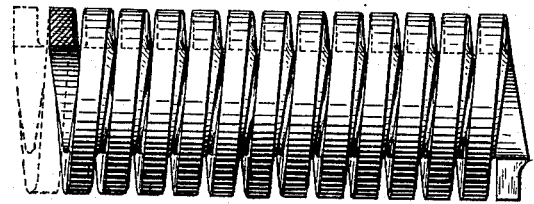
Figure 3:
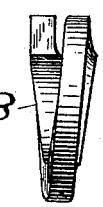
Figure 12:
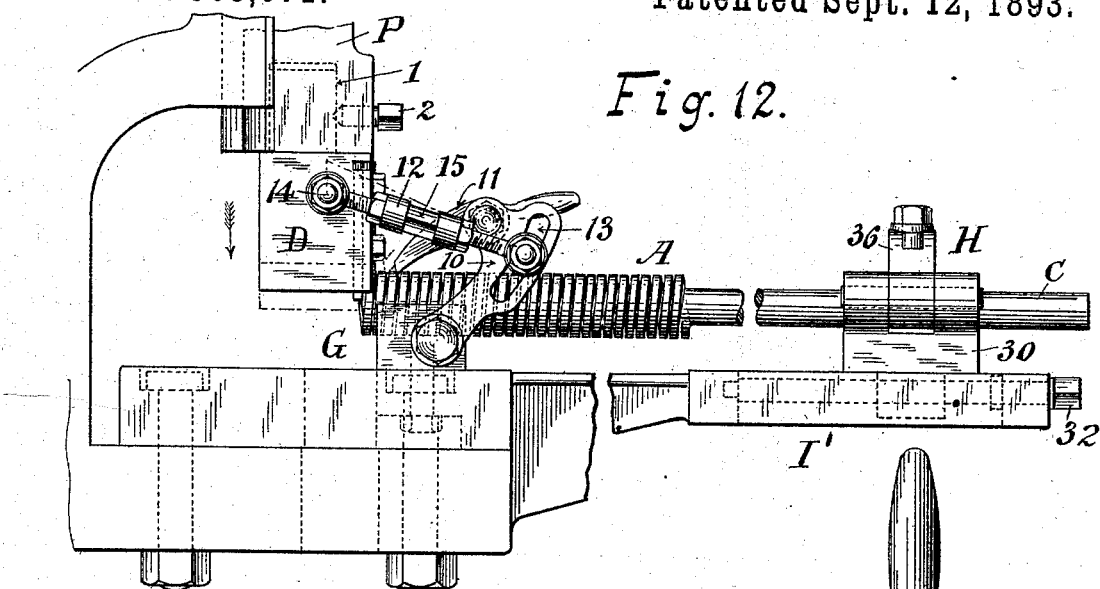
Figure 13:
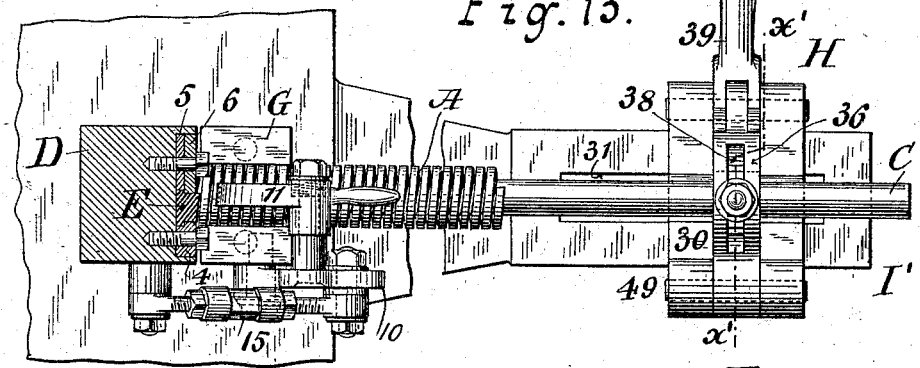
Figures 14, 15:
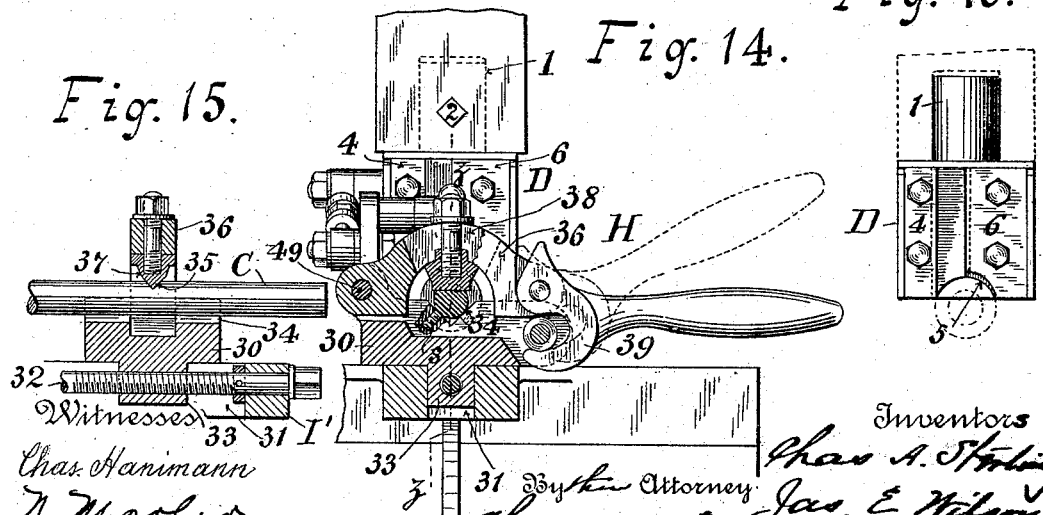
Figure 16:
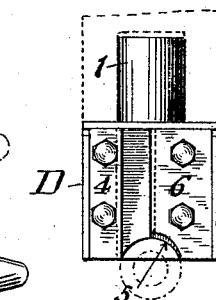
Figure 24:
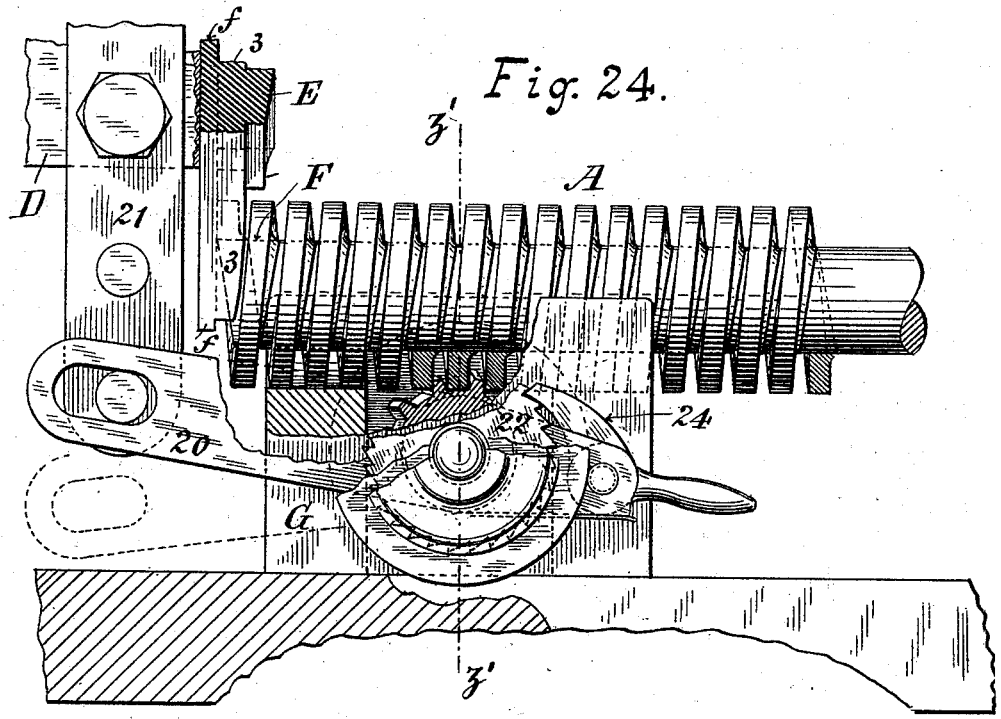

Referring to the accompanying drawings, in which similar letters and figures of reference indicate corresponding parts throughout: Figure 1, is a side elevation of the apparatus and a suitable press for operating it; Fig. 2, an enlarged detail view showing the coiled stock from which the articles are made; Fig. 3, an edge view of a washer; and Fig. 4, a face view thereof. Fig. 5, is an enlarged detail view taken in section on the line $x$—$x$, Fig. 1. Fig. 6, is a detail plan view partly in section, showing the lower part of Fig. 5. Fig. 7, is a detail view showing a sectional side elevation of Fig. 5. Fig. 8, is a section on the line $y$—$y$, of Fig. 7, viewed in the direction of the arrow $b$; Fig. 9, a section on the line $y$—$y$, Fig. 7, viewed in the direction of the arrow $b$; the coiled stock A, being removed, and its position indicated by dotted circles, while a washer B, which has just been separated is shown in the act of dropping. Figs. 10 and 11, are end views of the mandrel, coil, and separating tool, viewed in the direction of the arrow $a$, Fig. 7. Fig. 12, is an enlarged side elevation of the separating and feeding apparatus; and Fig. 13, a plan view of Fig. 12, partly in section; Fig. 14, a sectional view on the line $x'$—$x'$, Fig. 13, showing the same as Fig. 15. Fig. 15, is a sectional view on the line $z$—$z$, Fig. 14, showing the clamping device for the mandrel. Fig. 16, is a front view of the tool head; the tool being removed. Figs. 17 and 19 are end views of the mandrel, and Fig. 18, a plan view of the same partly broken away. Fig. 20, is a plan view illustrating a modification of the invention, wherein the cutting off head is rotary. Fig. 21, is a sectional elevation of Fig. 20, taken on the line $y'$—$y'$. Fig. 22, is an enlarged detail view partly in section, on the line $x^2$—$x^2$, Fig. 20. Fig. 23, is an enlarged detail side elevation partly in section on the line $y^2$—$y^2$, Fig. 22. Fig. 24, is an enlarged side elevation partly in section illustrating a modification of the feed device for the coil; and Fig. 25, a vertical section of Fig. 24, taken on the line $z'$—$z'$.

The features of the machine herein illustrated, consist elementarily, in a steel mandrel which is inserted through the coiled stock to be separated, having at its extremity a shearing edge formed thereon, and means for accurately adjusting and holding the mandrel in a fixed position. The separation is performed by a tool moving in a path at right angles to the axis of the coil and mandrel therein, acting as a shear, and operated by a suitable reciprocating or rotary or other tool holder. Means are also provided for slightly rotating the coil upon its own axis at each interval of separation, so that suitable clearances are left between the free extremities of the washers that are produced. Means are also provided for automatically feeding the coil toward the separating tool between the intervals of separating and for conveniently removing and readjusting the mandrel to substitute new coils as they are consumed.

Referring to Figs. 1 to 19 inclusive, A, represents the coiled stock of material to be operated upon; B, the washer separated therefrom; C, the mandrel for supporting the stock; and D, the reciprocating tool head bearing the separating tool E.

F, is the shear on the inner end of the mandrel C, and G, is the anvil or pillow block for supporting the coil.

H, is a clamp for adjusting and holding the mandrel in its proper position. The parts thus referred to are mounted upon any suitable frame I, I', and the reciprocating head D, is connected in any suitable manner; for instance, by a shaft 1, and set-screw 2, to a reciprocating cross-head P, of the machine. The cross-head P is driven by the well-known means of a balance wheel P', as indicated, fitted with the cam and clutch movement, common to die presses, and the reciprocating parts are thrown into or out of gear at will. By the continuous motion of the balance wheel, sufficient momentum is obtained to operate the tool head with the required force to separate the coil.

The mandrel C, fits accurately but loosely into the coil A, and the coil is fed forward toward the tool at proper intervals by means of automatic mechanism hereinafter described, and is partially rotated on the mandrel, at each interval of separation by means of a cam 3, more clearly illustrated in Figs. 5 to 11, inclusive, the cam 3 being attached to and forming part of the tool E, and moving with it. The cam 3, engages with the exposed end of the coil A, and rotates it previous to each separation, the extent of rotation being governed by the amount of the projecting cam surface. By this method of operation the convolutions are separated and given any desired amount of clearance at their free ends without removing any of the material of the coil, which as compared with the method of separating the convolutions and producing clearance by sawing or cutting the same, results in a substantial saving of material and in obtaining a greater number of separated convolutions from an equal amount of coiled stock.

The piece composing the tool E, and cam 3, is secured to the head D, by means of gibs 4, 5 and 6, which are cut away to clear the coil as indicated in Figs. 8 and 9.

The automatic feed for the coil, Figs. 12 and 13, consists in a rock arm 10, bearing a pawl 11, that engages directly with the coil A. A connecting rod 12, imparts motion from the cutter head D, to the rock arm 10, and in order to facilitate the adjustment of the stroke of the rock arm, to the pitch of the coil, a slot 13, is provided (concentric with the pivot 14, at its uppermost position) and the end of the rod 12 is adjustable therein. A turn buckle is also provided to the connecting rod 12, to adjust its length, and stop the feed stroke at the proper point.

Figure 25:
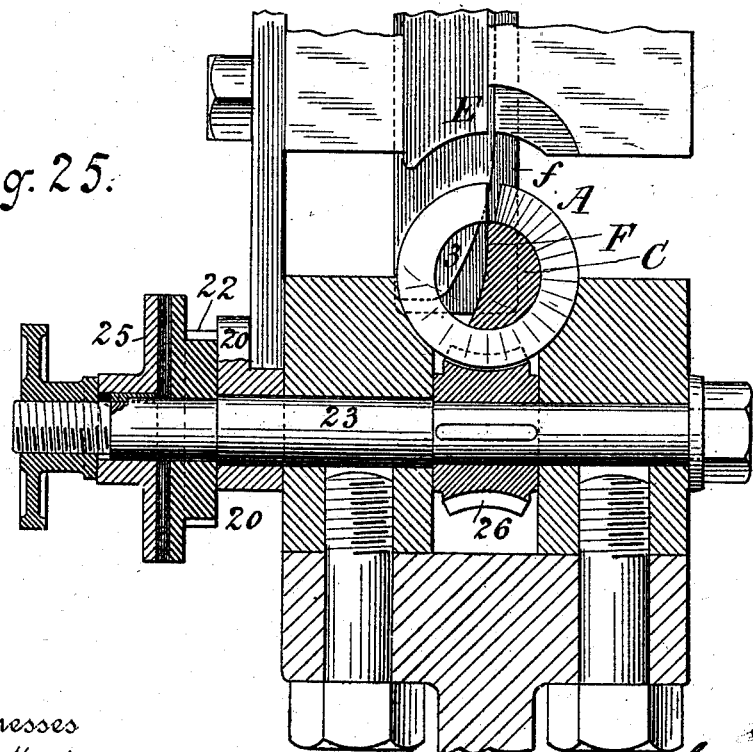

A modification of the feed is illustrated in Figs. 24 and 25, by a rock arm 20, connected and operated by the reciprocating head D, the extension 21, and a loose ratchet disk 22, on the shaft 23, operated by a pawl 24, carried on said arm 20. The ratchet disk 22, engages by friction with another disk 25, keyed to the shaft 23, and the latter bears a toothed pinion 26, that fits the spaces of the coil A. The stock is thus advanced toward the tool when the latter is descending, but is prevented from conflict by the lost motion of the disks when the stock abuts on the face of the cam 3.

The clamping device for the mandrel consists in a block 30, Figs. 12 and 15, which is longitudinally adjustable on the supporting bracket I' of the machine in a suitable slot 31, wherein an adjusting screw 32, engages with the tongue 33, of the block 30, rendering the longitudinal position of the mandrel accurately adjustable with reference to the tool E. The block 30 has a V-shaped binding groove 34, (Fig. 14) wherein the mandrel C, is firmly clamped by means of a binding yoke 36, hinged at 49, and held by the clamping hook 39. The bearing surface of the groove 34 may be provided with projecting screws S to compensate for wear. A V-shaped groove 35 is cut in the side of the mandrel C, transversely thereto, as seen more clearly in Fig. 18, and as indicated by dotted lines in Figs. 17 and 19. A V-shaped guide 37, within the yoke 36, bears in the groove 34, and holds the mandrel C, against rotative or longitudinal displacement. The guide 37, is circumferentially adjustable in the yoke 36, about the axis of the mandrel C; a suitable slot 38, in which the shank of the guide 37 is adjustable and suitably clamped, being provided for the purpose. By means of the rotative adjustment of the mandrel C, the shearing edge F, of the mandrel may be moved up to a proper setting in vertical line with the cutting tool E, each time it is re-ground as illustrated in the two Figs. 17 and 19.

Referring now to Figs. 20 to 23, inclusive, D' illustrates a rotary tool-head bearing a tool E', in substantially the same relation to the coil and mandrel and feed devices as hereinbefore described with reference to the preceding figures. The cam 3', is in this instance elongated and located on the periphery of the head D', in advance of the tool, and its operation is substantially the same as before described. The separating tool E', as seen in Fig. 23, is bolted through the rim of the revolving head D', which latter itself serves as a balance wheel. The feed pawl 11', of the coil A, is operated by a rock arm 41, the actuating cam 42, of which is upon the shaft 43 bearing the tool head.

Figure 4:
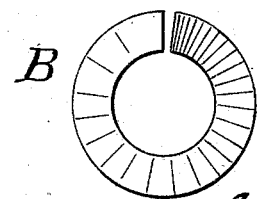

In cutting the convolutions from the stock thus formed, the operation of the herein-described machine is as follows:—The mandrel C, is first taken out from the clamp H, and is inserted through the coil A, and then replaced. The supply of a coil when a previous one has been consumed, is facilitated by the action of the clamp H, described, and the mandrel is at once self-adjusting; the screw 32, and guide 37 requiring re-adjustment only when the mandrel has become worn at its shearing edge, and has to be re-ground. The pawl 11, is then permitted to engage with the coil, and the machine being put in operation, the pawl automatically moves the coil to the proper position for severing, and continues to advance it until consumed. The upward stroke of the tool-head D, (according to Figs. 12 and 13) feeds the coil toward the tool longitudinally and the early part of the downward stroke partially rotates the coil by the action of the cam 3, upon the exposed end previously severed. The end of the coil is each time advanced into the path of the cam 3, by the feed; the position being indicated in Figs. 6, 7 and 8. The severing operation then occurs, the metal being slightly cut by the shearing edges E, F, and broken apart by the following contact of the tool E, the gib 5 serving to prevent swinging or deflection of the washer while being separated from the coil. Fig. 8, illustrates the period of separation. The free ends of the convolutions by virtue of the rotary feed given, are left with a gap between them, as seen in Fig. 4, in order to effect clearance when subjected to compression in use. The feed in Fig. 24, occurs at the down stroke of the tool head, and is limited by the abutment of the coil on the flange $f$, adjacent to the face of the descending cam 3, but the said flange $f$ is permitted to arrest the end feed before the coil is turned by the cam 3.

In Figs. 20 to 23, inclusive, the coil is fed by the pawl 11', lever 41 and cam 42 and rotated by the cam 3', and separated by the tool E', in consecutive order as the head D' continuously revolves.

What we claim, and desire to secure by Letters Patent, is—

1. In a machine for separating a coiled stock, a mandrel for supporting the coil provided with a shearing edge at its extremity, a separating tool moving substantially at right angles thereto, and means for slightly rotating the coil upon its axis at each interval of separation.

2. In a machine for separating a coiled stock, a stationary mandrel provided with a shearing edge or abutment adapted to support the stock, a movable shearing tool, and means for moving it substantially at right angles to the axis of the mandrel and toward the said shearing edge thereof, and a holder for the mandrel provided with means for universally adjusting the same.

3. In a machine for separating a coiled stock, a shearing tool, a mandrel for the coil comprising a stationary shear, a longitudinally adjustable holder for the mandrel, and a rotatively adjustable clamp or guide within the holder adapted to engage in fixed relation to the mandrel for the purpose described.

4. In a machine for separating a coiled stock, a mandrel for supporting the coil, a separating tool moving substantially at right angles to the axis of the mandrel, a feed mechanism for intermittently advancing the coil in the direction of its axis between the intervals of separating, and means for rotating the coil upon its axis at each interval of separation.

5. In a machine for separating a coiled stock, a separating tool provided with a projection beyond the separating part of said tool and having a lateral cam surface which engages with the coil to partially rotate the coil during the advance of said tool and previous to its separating action, whereby a space is provided at the point of separation of the coil without waste of material or change of its internal diameter.

6. In a machine for separating a coiled stock, a shearing tool, a cylindrical mandrel for the coil provided with a longitudinal shearing edge and a transverse holding notch, and a holder for the mandrel provided with a circumferentially adjustable V-shaped clamp presenting a transverse edge fitting the said notch, adapted to gage the longitudinal position and to determine the rotative adjustment of the said mandrel, substantially as described.

7. A machine for separating a coiled stock, comprising the following elements, a mandrel or arbor passing into the coil rigidly supported at one end and provided at its opposite end with a cutting edge; an anvil or pillow block for supporting the coil adjacent to the part operated upon; an exterior separating tool antagonizing the cutting edge of said mandrel and means for feeding and rotating the coil previous to the action of the separating tool.

CHAS. A. STERLING.
JAMES E. WILSON.

Witnesses:
C. M. HAY,
CHAS. W. FORBES.